(12) United States Patent
Huang et al.

(10) Patent No.: US 10,922,004 B2
(45) Date of Patent: Feb. 16, 2021

(54) SYSTEMS AND METHODS FOR MIGRATING DATA RECORDS

(71) Applicant: ZHEJIANG DAHUA TECHNOLOGY CO., LTD., Zhejiang (CN)

(72) Inventors: Le Huang, Hangzhou (CN); Xun Liu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 14 days.

(21) Appl. No.: 16/252,633

(22) Filed: Jan. 19, 2019

(65) Prior Publication Data

US 2019/0155536 A1 May 23, 2019

Related U.S. Application Data

(63) Continuation of application No. PCT/CN2017/081008, filed on Apr. 19, 2017.

(30) Foreign Application Priority Data

Jul. 19, 2016 (CN) .......................... 2016 1 0578746

(51) Int. Cl.
*G06F 3/06* (2006.01)
*G06F 16/00* (2019.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC ...... G06F 3/0604; G06F 3/0647; G06F 3/067; G06F 16/00; G06F 16/214; G06F 16/217; G06F 16/2455; G06F 16/27
See application file for complete search history.

(56) References Cited

U.S. PATENT DOCUMENTS 8,452,819 B1   5/2013  Sorenson, III et al.
8,825,976 B1 *  9/2014  Jones ................. G06F 12/0246
                                          711/112
(Continued)

FOREIGN PATENT DOCUMENTS

CN   103488778 A   1/2014
CN   103593347 A   2/2014
(Continued)

OTHER PUBLICATIONS

The Extended European Search Report in European Application No. 17830251.9 dated Apr. 11, 2019, 10 Pages.
(Continued)

*Primary Examiner* — Larry T Mackall
(74) *Attorney, Agent, or Firm* — Metis IP LLC

(57) ABSTRACT

According to various aspects of the present disclosure, methods, systems, and media for data migration are provided. In some embodiments, the systems may include: at least one computer-readable storage medium including a set of instructions for migrating data records; and at least one processor in communication with the computer-readable storage medium, wherein when executing the set of instructions, the at least one processor is directed to: query data in a data storage system comprising a plurality of slave nodes; determine, from a plurality of data records in the slave nodes, at least one candidate data record that satisfies a first condition; identify, from the slave nodes, at least one candidate slave node that satisfies a second condition; and in response to determining that the number of the at least one
(Continued)

candidate slave node is not less than a threshold value, migrate the candidate data record to a target slave node.

16 Claims, 6 Drawing Sheets

(51) Int. Cl.
*G06F 16/21* (2019.01)
*G06F 16/2455* (2019.01)

(52) U.S. Cl.
CPC ............ *G06F 16/00* (2019.01); *G06F 16/214* (2019.01); *G06F 16/217* (2019.01); *G06F 16/2455* (2019.01)

(56) References Cited

U.S. PATENT DOCUMENTS

2002/0082932 A1* 6/2002 Chinnappan ........... G06Q 30/06
705/26.8
2012/0166492 A1 6/2012 Bikkula et al.
2014/0074774 A1 3/2014 Ito et al.
2015/0169656 A1 6/2015 Ito et al.

FOREIGN PATENT DOCUMENTS

CN 103701916 A 4/2014
EP 2454887 B1 9/2013
WO 2018014613 A1 1/2018

OTHER PUBLICATIONS

International Search Report in PCT/CN2017/081008 dated Jun. 30, 2017, 5 pages.
Written Opinion in PCT/CN2017/081008 dated Jun. 30, 2017, 5 pages.
First Office Action in Chinese Application No. 201610578746.X dated Jan. 9, 2019, 17 pages.

* cited by examiner

SYSTEMS AND METHODS FOR MIGRATING DATA RECORDS

CROSS-REFERENCE TO RELATED APPLICATIONS

This application is a continuation of International Application No. PCT/CN2017/081008, filed on Apr. 19, 2017, which claims priority to Chinese Application No. 201610578746.X, filed on Jul. 19, 2016, which is incorporated herein by reference in its entirety.

TECHNICAL FIELD

The present disclosure generally relates to computer systems, and in particular, to systems and methods for migrating data in a data storage system (e.g., a distributed data storage system).

BACKGROUND

In a data storage system (e.g., a distributed data storage system), a master data store (e.g., a master node) can distribute data records to several slave data stores (e.g., slave nodes). When a user wants to query data in the data storage system, the slave nodes are often connected to each other to migrate data records. However, migration of data records from one or more data stores to one or more other databases can often increase the communication burden of the data storage system.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to an aspect of the present disclosure, a system for migrating data is disclosed. The system may include: at least one computer-readable storage medium including a set of instructions for migrating data records; and at least one processor in communication with the computer-readable storage medium, wherein when executing the set of instructions, the at least one processor is directed to: query data in a data storage system comprising a plurality of slave nodes; determine, from a plurality of data records in the plurality of slave nodes, at least one candidate data record that satisfies a first condition; identify, from the plurality of slave nodes, at least one candidate slave node that satisfies a second condition; and in response to determining that the number of the at least one candidate slave node is not less than a threshold value, migrate the at least one candidate data record to at least one target slave node.

In some embodiments, the data storage system is a distributed data storage system.

In some embodiments, to identify the at least one candidate slave node that satisfies the second condition, the at least one processor is further directed to: determine whether a current slave node of the plurality of slave nodes satisfies the second condition in response to determining that a first data record in the current slave node satisfies the first condition.

In some embodiments, to identify the at least one candidate data record that satisfies the first condition, the at least one processor is further directed to: determine a first parameter representative of the number of transmissions of the candidate data record from the at least one candidate slave node to the target slave node; and determine that the first parameter representative is not less than a first threshold.

In some embodiments, to determine the at least one candidate data record that satisfies the first condition, the at least one processor is further directed to: determine a second parameter representative of the number of data queries in the data storage system; and determine that a ratio of the first parameter to the second parameter is not less than a second threshold.

In some embodiments, to identify the at least one candidate slave node, the at least one processor is further directed to: determine a third parameter representative of the number of data records that satisfy the first condition in the candidate slave node; and determine that the third parameter is not less than a third threshold.

In some embodiments, to identify the at least one candidate slave node, the at least one processor is further directed to: determine a fourth parameter representative of the number of the data records in the candidate slave node; and determine that a ratio of the third parameter to the fourth parameter is not less than a fourth threshold.

In some embodiments, the threshold value corresponds to the number of the plurality of slave nodes.

According to another aspect of the present disclosure, a method for migrating data is disclosed. The method may include: querying data in a data storage system comprising a plurality of slave nodes; determining, from a plurality of data records in the plurality of slave nodes, at least one candidate data record that satisfies a first condition; identifying, from the plurality of slave nodes, at least one candidate slave node that satisfies a second condition; and in response to determining that the number of the at least one candidate slave node is not less than a threshold value, migrating, by at least one processor, the at least one candidate data record to at least one target slave node.

According to still another aspect of the present disclosure, a non-transitory computer-readable medium is provided. The non-transitory computer-readable medium may include at least one set of instructions for migrating data records, wherein when executed by at least one processor, the at least one set of instructions directs the at least one processor to: query data in a data storage system comprising a plurality of slave nodes; determine, from a plurality of data records in the plurality of slave nodes, at least one candidate data record that satisfies a first condition; identify, from the plurality of slave nodes, at least one candidate slave node that satisfies a second condition; and in response to determining that the number of the at least one candidate slave node is not less than a threshold value, migrate the at least one candidate data record to at least one target slave node.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
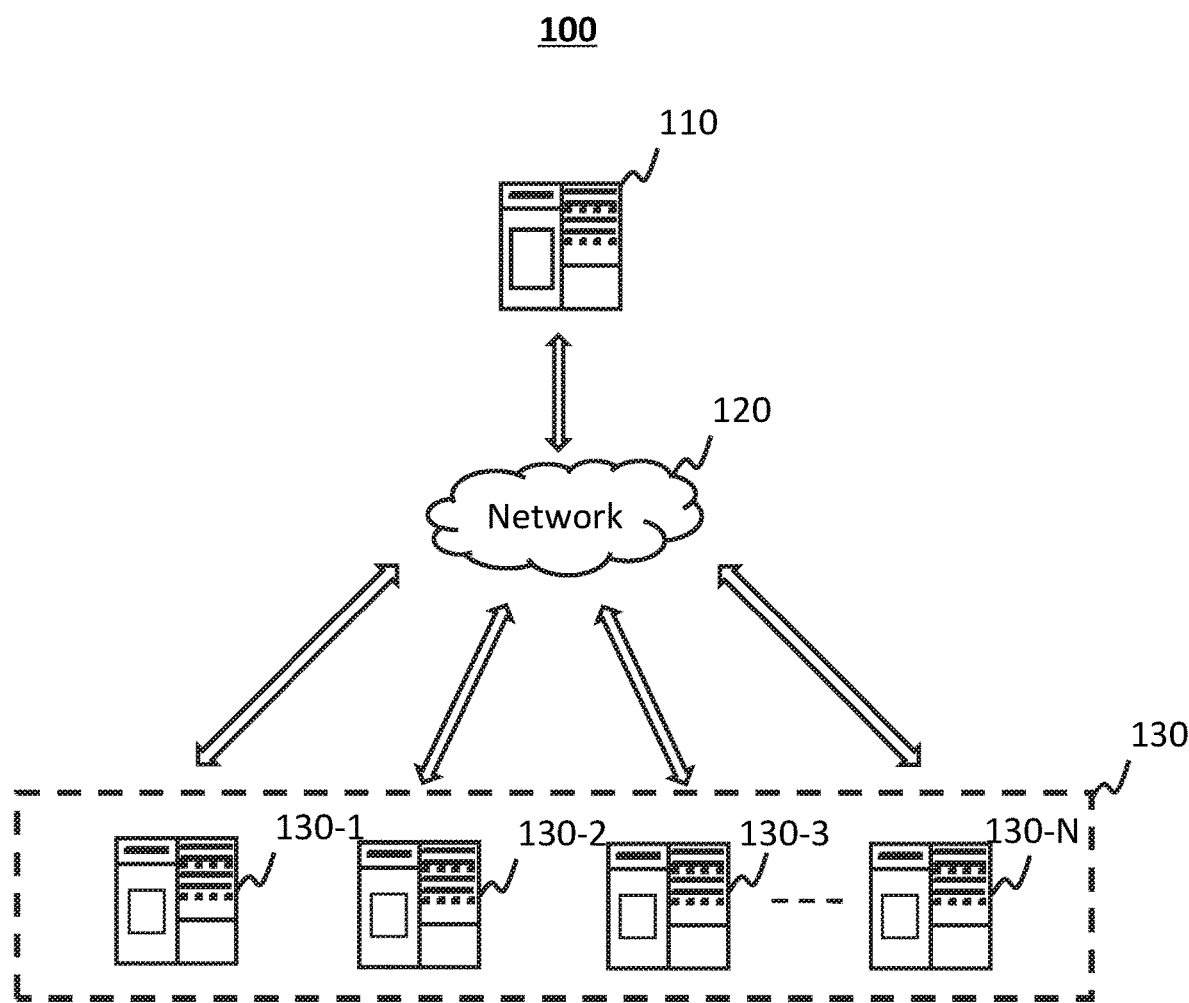
FIG. 1 is a block diagram of an exemplary data storage system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be understood, however, that the drawing(s) are for the purpose of illustration and description only and are not intended to limit the scope of the present disclosure. It is understood that the drawings are not to scale.

FIG. 1 is a block diagram of an exemplary data storage system 100 according to some embodiments of the present disclosure. In some embodiments, the data storage system 100 may include a homogeneous data storage system, a heterogeneous data storage system, a synchronous data storage system, an asynchronous data storage system, a client/server database system, or the like, or any combination thereof. The data storage system 100 may include a master node 110, a network 120, and one or more slave nodes 130. The slave node(s) 130 may include a slave node 130-1, a slave node 130-2, a slave node 130-3, . . . , and a slave node 130-N. In some embodiments, the data storage system 100 may include at least two slave nodes. In some embodiments, the data storage system 100 may be a distributed data storage system.

Figure 2:
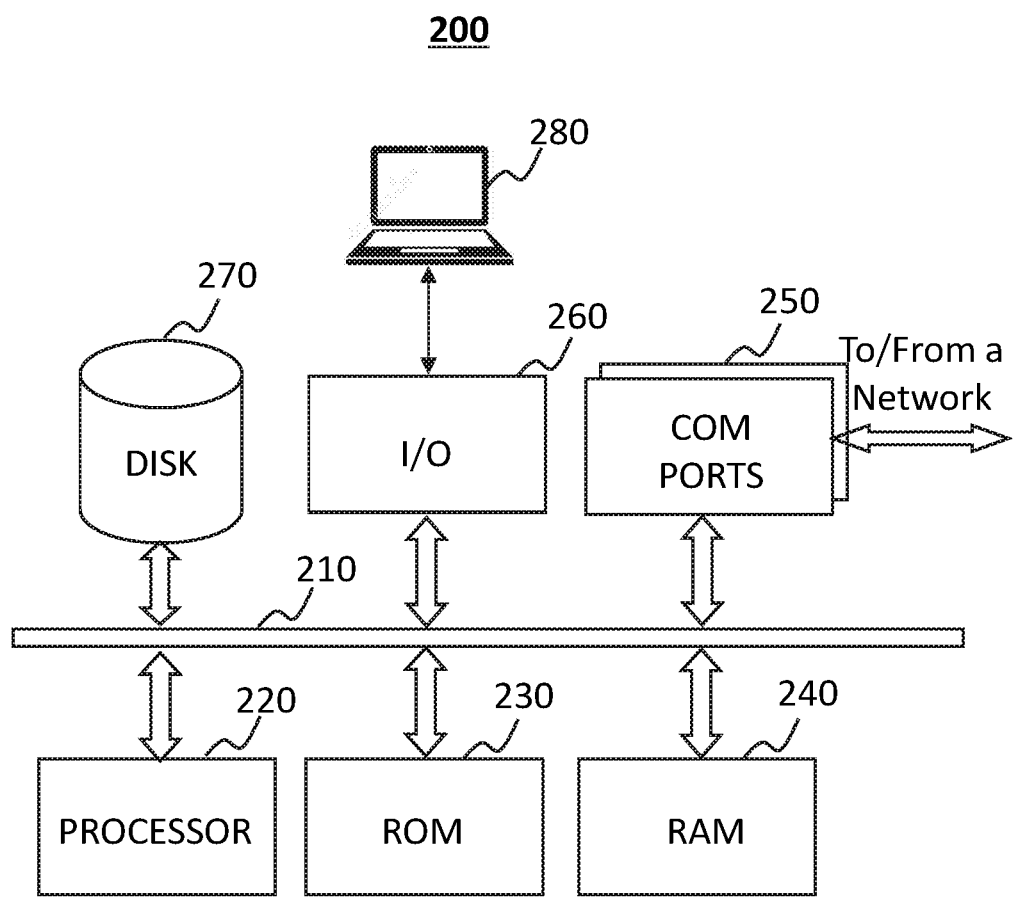
FIG. 2 is a block diagram of an exemplary computing device according to some embodiments of the present disclosure.

The master node 110 may include any suitable device that is capable of processing, storing, receiving, transmitting, etc. data. For example, the master node 110 can include any type of computing device, such as a device including a processor, a computer-readable medium, and memory. The computing device may include, for example, a server computer, a desktop computer, a mobile phone, etc. In some embodiments, the master node 110 may be implemented on one or more computing devices having one or more components as illustrated in FIG. 2 in the present disclosure.

The master node 110 can process data stored in the data storage system 100. For example, the master node 110 may conduct one or more processes of data migration. In some embodiments, the master node 110 may be a single server, or a server group. In some embodiments, the master node 110 may be local or remote. For example, the master node 110 may access and/or migrate data stored in the slave node (e.g., the slave node 130-1, 130-2, 130-3, . . . , and/or 130-N) via the network 120. As another example, the master node 110 may be directly connected to the slave node (e.g., the slave nodes 130-1, 130-2, 130-3, . . . , and/or 130-N) to access and/or migrate stored data. In some embodiments, the master node 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The network 120 may facilitate exchange of information and/or data. In some embodiments, one or more components in the data storage system 100 (e.g., the master node 110, the slave node 130-1, 130-2, 130-3, . . . , and/or 130-N, etc.) may send information and/or data to other component(s) in the data storage system 100 via the network 120. For example, the master node 110 may access the data stored in the slave node 130-1 via the network 120. As another example, one or more slave nodes of the slave nodes 130-1, 130-2, 130-3, . . . , and/or 130-N may migrate the stored data from one slave node to another. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof.

Each of the slave node(s) 130 (e.g., the slave node 130-1, 130-2, 130-3, . . . , and/or 130-N) may store one or more data records. In some embodiments, the data record(s) may be migrated from a slave node (also referred to as the "source slave node") to one or more other slave nodes (also referred to as the "target slave nodes"). The slave node(s) 130 (e.g., the slave node 130-1, 130-2, 130-3, . . . , and/or 130-N) may or may not have the same or similar configuration with each other. In some embodiments, each of the slave nodes 130 may be implemented on a cloud platform. For example, the cloud platform may include a private cloud, a public cloud, a hybrid cloud, a community cloud, a distributed cloud, an inter-cloud, a multi-cloud, or the like, or any combination thereof.

Each of the slave nodes 130 may include any suitable device that is capable of processing, storing, receiving, transmitting, etc. data. For example, each of the slave nodes 130 can include any type of computing device, such as a device including a processor, a computer-readable medium, and memory. The computing device may include, for example, a server computer, a desktop computer, a mobile device (e.g., a mobile phone, a tablet computing device, a laptop, etc.), or the like, or any combination thereof. The mobile device may include a smart home device, a wearable device, a smart mobile device, a virtual reality device, an augmented reality device, or the like, or any combination thereof. The smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, each of the slave nodes 130 may be implemented on one or more computing devices having one or more components as illustrated in FIG. 2 in the present disclosure.

In some embodiments, each of the mast node 110 and slave node(s) 130 can include one or more storage devices. As referred to herein, a storage device may be any device that is capable of storing data. For example, the storage device can include a memory (e.g., random access memory), a cache, a drive (e.g., a hard drive), a flash drive, a database system, and/or any other type of device capable of storing data. In some embodiments, the storage device can include multiple storage components (e.g., multiple devices and/or multiple databases) that may also span multiple computing devices (e.g., multiple server computers or any other computing devices).

In some embodiments, the master node may distribute data records stored in the master node to one or more slave nodes. The slave nodes may include multiple computing devices located in one or more physical locations, or dispersed over a network of interconnected computing devices.

FIG. 2 is a block diagram of an exemplary computing device 200 according to embodiments of the present disclosure of the present disclosure. Each of the master node 110 and/or slave nodes 130 (e.g., slave nodes 130-1, 130-2, 130-3, . . . , and/or 130-N) may be implemented using one or more computing devices 200 and/or one or more portions of computing devices 200.

The computing device 200 may be used to implement a data storage system for the present disclosure. The computing device 200 may implement any component of the data storage system as described herein. In FIGS. 1-2, only one such computer device is shown purely for convenience purposes. One of ordinary skill in the art would understood at the time of filing of this application that the computer functions relating to the data storage system as described herein may be implemented in a distributed fashion on a number of similar platforms, to distribute the processing load.

Referring back to FIG. 2, the computing device 200 may include an internal communication bus 210, a processor 220, a read only memory (ROM) 230, a random-access memory (RAM) 240, COM ports 250, an input/output (I/O) component 260, a disk 270, and a user interface element 280.

The internal communication bus 210 may transfer information and/or data between one or more components of the computing device 200. For example, the internal communication bus 210 may connect the processor 220 with a storage (e.g., the RAM 240, the ROM 230, etc.) for exchanging information and/or data. In some embodiments, the internal communication bus 210 may include a hardware component and/or a software implementation. For example, the internal communication bus 210 may include a wire, an optical fiber, a cable, a communication protocol, or the like, or any combination thereof.

The processor 220 may execute instructions and/or data to perform one or more functions described in the present disclosure. For example, the processor 220 may determine whether one or more data records in a current slave node satisfy one or more condition as for data migration. As another example, the processor 220 may determine whether a current slave node satisfies a second condition. As still another example, the processor 220 may migrate one or more data records that satisfy the first condition in one or more slave nodes that satisfy the second condition to one or more corresponding target slave nodes. In some embodiments, the processor 220 may include one or more processors (e.g., single-core processor(s) or multi-core processor(s)). Merely by way of example, the processor 220 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 220 is described in the computing device 200. However, it should be noted that the computing device 200 in the present disclosure may also include multiple processors, thus operations and/or method steps that are performed by one processor 220 as described in the present disclosure may also be jointly or separately performed by the multiple CPUs/processors. For example, if in the present disclosure the processor 220 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 230, the RAM 240, and/or the disk 270 may store data and/or instructions that may perform one or more functions described in the present disclosure. For example, the ROM 230, the RAM 240, and/or the disk 270 may store instructions executed by the processor 220 to determine whether one or more data records in a current slave node satisfy a first condition. As another example, the ROM 230, the RAM 240, and/or the disk 270 may store instructions executed by the processor 220 to migrate one or more data records that satisfy the first condition in one or more slave nodes that satisfy the second condition to one or more corresponding target slave nodes. In some embodiments, the RAM 240 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 230 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 270 may include a magnetic disk, an optical disk, a solid-state drive, a flash drive, a floppy disk, an optical disk, a memory card, a zip disk, a magnetic tape, or the like, or any combination thereof. In some embodiments, the ROM 230, the RAM 240, and/or the disk 270 may include a data storage, an application, etc. In some embodiments, the data storage may be any hardware or software for storing data, including a circuitry, a program, etc. In some embodiments, the application may include any application that may be installed in the computing device 200 for querying data.

The COM ports 250 may be connected to and from a network connected thereto to facilitate data communications. In some embodiments, the COM ports 250 may be interface with the network 120 and/or one or more components in the data storage system 100. In some embodiments, the COM ports 250 may be any type of wired or wireless network interface. Merely by way of example, the COM ports 250 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 250 may be implemented according to programming and/or computer language(s). The COM ports 250 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The I/O 260 may support an input/output between the computing device 200 and other components therein such as a user interface element 280. Merely by way of example, the I/O 260 may include an audio interface, a display, a keypad/keyboard, or the like, or any combination thereof. The audio interface may be a device for exchanging audio information or signal. For example, the audio interface may input an audio and/or output an audio to the computing device 200. In some embodiments, the audio interface may include a Sony/Philips digital interface format (S/PDIF), a Radio Corporation of America (RCA) connector, a phone connector, a Alesis digital audio tape (ADAT), an Audio Engineering Society/European broadcasting union interface (AES/EBU), a bayonet Neill-Concelman (BNC) interface, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

Figure 3:
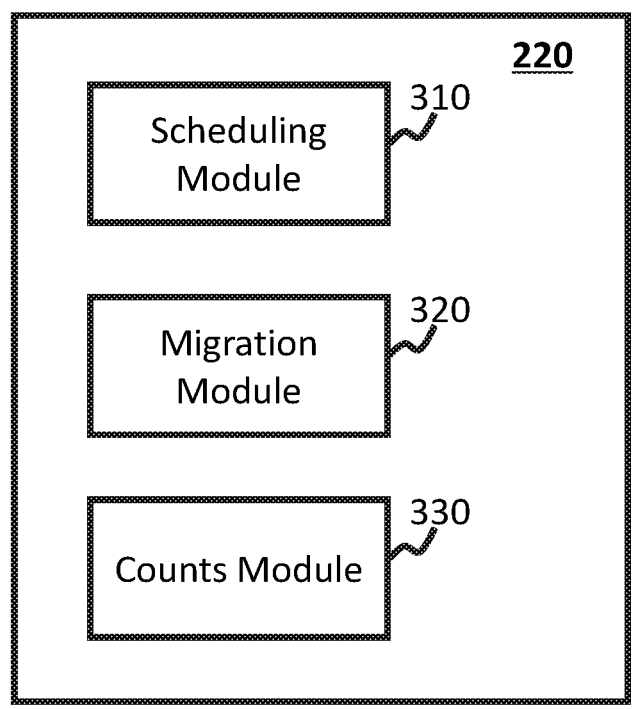
FIG. 3 is a block diagram of an exemplary processor according to some embodiments of the present disclosure.

FIG. 3 is a block diagram illustrating an exemplary processor 220 according to some embodiments of the present disclosure of the present disclosure. The processor 220 may include a scheduling module 310, a migration module 320, and a counts module 330.

The scheduling module 310 may be configured to determine data migration policies for one or more data storage systems (e.g., the data storage system 100) and/or schedule data migration for the data storage system(s) based on the data migration policies. The data migration policies may include one or more data migration policies corresponding to one or more data records, one or more data migration policies corresponding to one or more data storage devices and/or nodes. As will be discussed in more detail in connection with FIGS. 4-6, the scheduling module 310 can determine whether a data record in a slave node satisfies a first data migration condition and/or whether the slave node satisfies a second data migration condition. The scheduling module 310 can then schedule data migration based on the determination.

In some embodiments, the scheduling module 310 can schedule data migration for one or more data records (e.g., by determining when a data record is to be migrated and/or a target node to which the data record is migrated to, etc.). The scheduling module 310 can then generate data about such data migration (also referred to as the "scheduling data") and provide the scheduling data to the migration module 320. The scheduling data may include, for example, information about a source node from which a data record is to be migrated, information about a target node to which the data record is to be migrated, timing information about the migration, information about the data record, and/or any other suitable information related to migration of the data record.

In some embodiments, the scheduling module 310 can determine one or more data records of the data records in the slave nodes that satisfies a first condition (also referred to as the "candidate data records"). The candidate data record(s) may be determined, for example, by analyzing the data records in each of the slave nodes (e.g., by performing one or more operations described in connection with FIGS. 4-6). In some embodiments, multiple data records in a given slave node can be analyzed in parallel, sequentially, randomly, and/or in any other suitable order to determine whether each of the data records satisfies the first condition. In some embodiments, multiple slave nodes may be analyzed in parallel, sequentially, randomly, and/or in any other suitable order for determination as to satisfaction of the first condition.

In some embodiments, the scheduling module 310 can identify, from the slave nodes, one or more slave node that satisfy a second condition (also referred to as the "candidate slave nodes"). In some embodiments, multiple slave nodes may be analyzed in parallel, sequentially, randomly, and/or in any other suitable order for determination as to satisfaction of the second condition. The candidate slave nodes may be identified, for example, by performing one or more operations described in connection with FIGS. 4-6 below.

In some embodiments, the scheduling module 310 can determine the number of the candidate slave nodes and can compare the number of the candidate slave nodes with a threshold value. In response to determining that the number of the at least one candidate slave node is not less than (or greater than) the threshold value, the scheduling module 310 may cause the candidate data records to be migrated to a target slave node (e.g., by generating and/or providing scheduling data for the migration).

The migration module 320 may be configured to migrate one or more data records from a source slave node to one or more target slave nodes (e.g., based on scheduling data provided by the scheduling module 301).

The counts module 330 may be configured to determine the number of elements in migrating a data record. For example, the count module 330 may be configured to determine the number of the slave nodes in a data storage system. As another example, the count module 330 may be configured to determine the number of the transmissions of a data record from a source slave node to a target slave node. As still another example, the count module 330 may be configured to determine the data records that satisfy a data migration condition.

The modules in the processor 220 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the scheduling module 310 may be integrated in the migration module 320 as a single module that can determine whether one or more data records satisfy particular data migration policies and perform data migration based on the determination.

In some embodiments, one or more data records stored in at least two slave nodes may be connected for data records migration. For example, data records stored in a slave node 1 may be transmitted to a slave node 2 for connecting the data records stored thereof. As another example, data records stored in the slave node 2 may be transmitted to the slave node 1 for connecting the data records stored thereof.

In some embodiments, if the data records in the slave node 1 and slave node 2 do not match each other, the data records in the slave node 1 may be not connected with the data records in the slave node 2. In some embodiments, the data records that may not be connected may be transmitted to increase the communication burden. In some embodiments, the connection between two slave nodes may include a natural join, an equijoin, a non-equijoin, a semi-join, an anti-join, a division, a θ-join and equijoin, a left outer join, a right outer join, a full outer join, a cross join, a hash join, a nested loop outer join, a sort merge outer join, a Bloom join, or the like, or any combination thereof.

For illustration purpose only, a semi-join and a Bloom join may be used as examples for connecting two slave nodes as illustrated in TABLE 1.

TABLE 1

| Slave node 1 | | | Salve node 2 | | |
|---|---|---|---|---|---|
| Data record ID | Fragment A | Fragment B | Data record ID | Fragment B | Fragment C |
| 1 | A1 | B1 | 1 | B1 | C1 |
| 2 | A2 | B4 | 2 | B5 | C2 |
| 3 | A3 | B3 | 3 | B2 | C3 |
| 4 | A4 | B4 | 4 | B2 | C4 |

As illustrated in TABLE 1, the fragment B may be used as a connection fragment. In the semi-join, data records in the slave node 1 may be projected to a set of {B1, B3, B4}. The set may be transmitted to the slave node 2. The data records in the slave node 2 may be reduced as TABLE 2. The data records in TABLE 2 may be transmitted to the slave node 1 for connection. The connection result is shown as entries in TABLE 3.

TABLE 2

| Slave node 2 | | |
|---|---|---|
| Data record ID | Fragment B | Fragment C |
| 1 | B1 | C1 |

TABLE 3

| Data record ID | Fragment A | Fragment B | Fragment C |
|---|---|---|---|
| 1 | A1 | B1 | C1 |

In the Bloom join, the data records in the slave node 1 as shown in TABLE 1 may be projected to a set of {B1, B3, B4}. The set may be transformed to a bit vector of 10110 by using a Hash function. The first number "1" may refer to Hash(B1)=1. The second number "0" may refer to Hash(B2)=0. The number "1" in the third and fourth bit may refer to Hash (B3)=1, and Hash (B4)=1, respectively. The bit vector of 10110 may be transmitted to the slave node 2. In some embodiments, the data records in the slave node 2 may be transformed in the same way as the slave node 1. The data records in the slave node 2 may be transformed to a bit vector of 11001 by using the same Hash function. The data records in the slave node 2 may be reduced as TABLE 2. The data records in TABLE 2 may be transmitted to the slave node 1 for connection. The connection result is shown as entries in TABLE 3.

Figure 4:
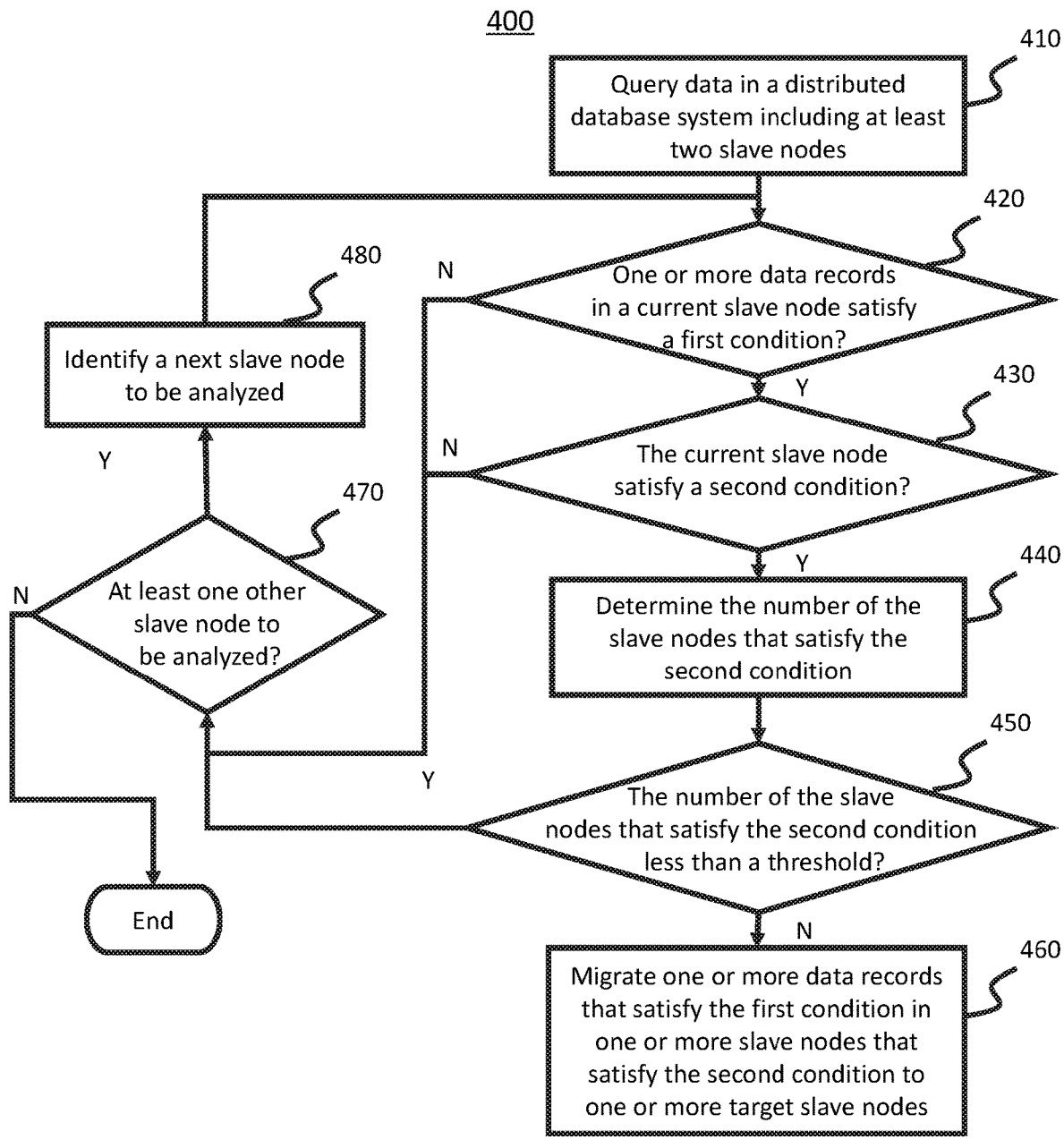
FIG. 4 is a flowchart of an exemplary process for migrating data records according to some embodiments of the present disclosure.

FIG. 4 is a flowchart of an exemplary process 400 for migrating data records according to some embodiments of the present disclosure. In some embodiments, the process 400 may be implemented in the data storage system 100 as illustrated in FIG. 1. For example, the process 400 may be stored as a form of instructions, and invoked and/or executed by the master node 110. As another example, the process 400 may be stored in the storage (e.g., the ROM 230, the RAM 240, the disk 270, etc.) of the computing device 200 (e.g., the master node 110, the slave node 130 as illustrated in FIG. 1) as a form of instructions, and invoked and/or executed by the processor 220 of the computing device 200 (e.g., the master node 110, the slave node 130-1 as illustrated in FIG. 1).

In step 410, a processor (e.g., the processor 220 or any other suitable hardware processor) may query data in a data storage system including at least two slave nodes. In some embodiments, the data query may be a request for information and/or data from the data storage system 100. The data storage system may be, for example, the data storage system 100 as described in connection with FIG. 1. In some embodiments, the data storage system may be a distributed data storage system.

In step 420, the processor may determine whether one or more data records stored in a current slave node satisfy a first condition. The first condition may include a data migration policy corresponding to a data record. For example, the first condition may include a condition that a first parameter representative of the number of transmissions of a data record from the current slave node to a target slave node is not less than a first threshold. The number of transmissions of a data record may be determined based on the number of transmissions of the data record within a particular time period, the number of transmissions of the data record from a particular current slave node, the number of transmissions of the data record to a particular target slave node, etc. The particular time period may be, for example, a predetermined time period. More particularly, for example, the processor may determine the number of transmissions of a particular data record from the current slave nodes to the target slave node within the predetermined time period.

As another example, the first condition can include a particular number of transmissions of the data record from the current node to the target node. The particular number may be, for example, the greatest number, a predetermined number, etc. More particularly, for example, the processor 220 can determine the number of transmissions of each data record from the current slave node to the target slave node. The processor 220 can then determine that a particular data record satisfies the first condition in response to determining that the number of transmissions of the data record from the current slave node to the target slave node is the greatest among the numbers of transmissions of the data records.

As still another example, the first condition may include a condition that a ratio of the first parameter representative of the member of transmission of a data record from the current slave node to a target slave node to a second parameter representative of the number of data queries in a data storage system 100 is not less than a second threshold. The second parameter representative can represent the number of data queries in the data storage system 100 during a particular period of time. The second parameter representative may represent the number of a particular kind of data queries in the data storage system 100. The second parameter representative may represent the number of data queries in a particular number of slave nodes in the data storage system 100. In some embodiments, the second threshold may be variable according to different application scenarios of the data storage system 100. More particularly, for example, the second threshold may be any fraction within a predetermined range from 0 to 1.

In some embodiments, the processor can determine whether the data record(s) stored in the current slave node satisfy the first condition by performing one or more operations as described in connection with FIG. 5 below. In some embodiments, a determination may be made as to whether each of the data records in the current slave node satisfies the first condition. The processor can also determine whether a number of data records (e.g., a certain number of data records, a percentage of the data records on the current node, etc.) on the current node satisfy the first condition.

In some embodiments, in response to determining that one or more data records in the current slave node satisfy the first condition, the processor may proceed to step 430. Alternatively, the processor may proceed to step 470 in response to determining that no data record in the current slave node satisfies the first condition.

In step 430, the processor may determine whether the current slave node satisfies a second condition. The second condition may include a data migration policy corresponding to a node. For example, the second condition may include a condition that a ratio of a third parameter representative of the number of the data records that satisfy the first condition in the current slave node to a fourth parameter representative of the number of the data records in the current slave node is not less than a fourth threshold. In some embodiments, the processor 220 may determine the number of the data records that satisfy the first condition in the current slave node within a particular time period. The particular time period may be, for example, a predetermined time period. The number of data records that satisfy the first condition may be predetermined and stored in a storage device (e.g., the ROM 230, the RAM 240, the disk 270, etc.). The processor may then determine the number of data records that satisfy the first condition by retrieving the number stored in the storage.

In some embodiments, the fourth threshold may be adjusted according to different application scenarios of the data storage system. For example, the fourth threshold may be any fraction within a predetermined range from 0 to 1. More particularly, for example, the fourth threshold may be a fraction that represents at least one of the total number of the data records in the current slave node.

In some embodiments, the processor may determine whether the current slave node satisfies the second condition by performing one or more operations as described in connection with FIG. 6 below. In some embodiments, a determination may be made as to whether each of the slave node in the data storage system satisfies the second condition. The processor 220 may also determine whether a number of slave nodes (e.g., a certain number of slave nodes, a percentage of slave nodes in the distributed database, etc.) in the data storage system satisfy the second condition.

In some embodiments, in response to determining that current slave node satisfies the second condition, the processor may proceed to step 440. Alternatively, the processor may proceed to step 470 in response to determining that the current slave node does not satisfy the second condition.

In step 440, the processor 220 may determine the number of the slave nodes that satisfy the second condition in the data storage system 100. For example, the number of slave nodes that satisfy the second condition in the data storage system may be determine within a particular time period. As another example, the number of the slave nodes that satisfy the second condition in the data storage system may be determined according to superposing the slave nodes that satisfy the second condition in the step 430. As still another example, the number of slave nodes that satisfy the second condition in the data storage system may be stored in the predetermined and stored in a storage device (e.g., the ROM 230, the RAM 240, the disk 270, etc.). The processor may then determine the number of slave nodes that satisfy the second condition in the data storage system by retrieving the number stored in the storage.

In step 450, the processor 220 may determine whether the number of the slave nodes that satisfy the second condition in the data storage system is less than a threshold value. The threshold value may be adjusted according to different application scenarios of the data storage system. More particularly, for example, the threshold value may be an integer within a predetermined range.

In some embodiments, in response to determining that the number of slave nodes that satisfy the second condition is not less than the node threshold, the process may proceed to step 460.

In step 460, the processor may migrate one or more data records that satisfy the first condition in one or more slave nodes that satisfy the second condition to one or more target slave nodes. In some embodiments, the target slave nodes may include one or more slave nodes corresponding to a particular number of transmissions of the data records. The particular number may be, for example, the greatest number, a predetermined number, etc. More particularly, for example, the processor may determine the number of transmissions of data records to each target slave node. The processor may then determine that the target slave nodes in response to determining that the number of transmission of data records to the target slave nodes is the greatest among the target slave nodes. In some embodiments, the processor may migrate the data record(s) by generate scheduling data related to the migration and provide (e.g., transmit) the data to one or more other devices for migrating the data record(s) based on the scheduling data. The scheduling data may include, for example, information about the current node, information about the target slave node(s), information about the data record(s) to be migrated, timing information about the migration of the data record(s), and/or any other data and/or information related to the migration of the data record(s).

In some embodiments, in response to determining that one or more data records in the current slave node does not satisfy the first condition (e.g., "NO" in step 420), the processor may determine whether at least one other slave node is to be analyzed in step 470. For example, the processor can determine whether all of the slave nodes in the data storage system have been analyzed. As another example, the processor 220 can determine whether a particular number of slave nodes in the data storage system have been analyzed.

In some embodiment, in response to determining that no slave node is to be analyzed, the processor may conclude the process 400. Alternatively, in response to determining that there is at least one other slave node to be analyzed, the processor may identify a next slave node to be analyzed in step 480. In some embodiments, the processor 220 may loop back to step 420 to analyze the next slave node. More particularly, for example, steps 420-480 may be performed to analyze the next slave node for data migration.

In some embodiments, in response to determining that the current slave node does not satisfy the second condition (e.g., "NO" in step 430), the processor may determine whether at least one other slave node is to be analyzed in step 470. For example, the processor may determine whether all of the slave nodes in the data storage system have been analyzed. As another example, the processor 220 may determine whether a particular number of slave nodes in the data storage system have been analyzed.

In some embodiments, in response to determining that no slave node is to be analyzed, the processor may conclude the process 400. Alternatively, in response to determining that there is at least one other slave node to be analyzed, the processor may identify a next slave node to be analyzed in step 480. In some embodiments, the processor may loop back to step 420 to analyze the next slave node. More particularly, for example, steps 420-480 may be performed to analyze the next slave node for data migration.

In some embodiments, in response to determining that the first parameter representative is less than the first threshold (e.g., "YES" in step 450), the processor may determine whether at least one other slave node is to be analyzed in step 470. For example, the processor may determine whether all of the slave nodes in the data storage system have been analyzed. As another example, the processor may determine whether a particular number of slave nodes in the data storage system have been analyzed.

In some embodiments, in response to determining that on slave node is to be analyzed, the processor may conclude the process 400. Alternatively, in response to determining that there is at least one other slave node to be analyzed, the processor may identify a next slave node to be analyzed in step 480. In some embodiments, the processor 220 may loop back to step 420 to analyze the next slave node. More particularly, for example, steps 420-480 may be performed to analyze the next slave node for data migration.

Figure 5:
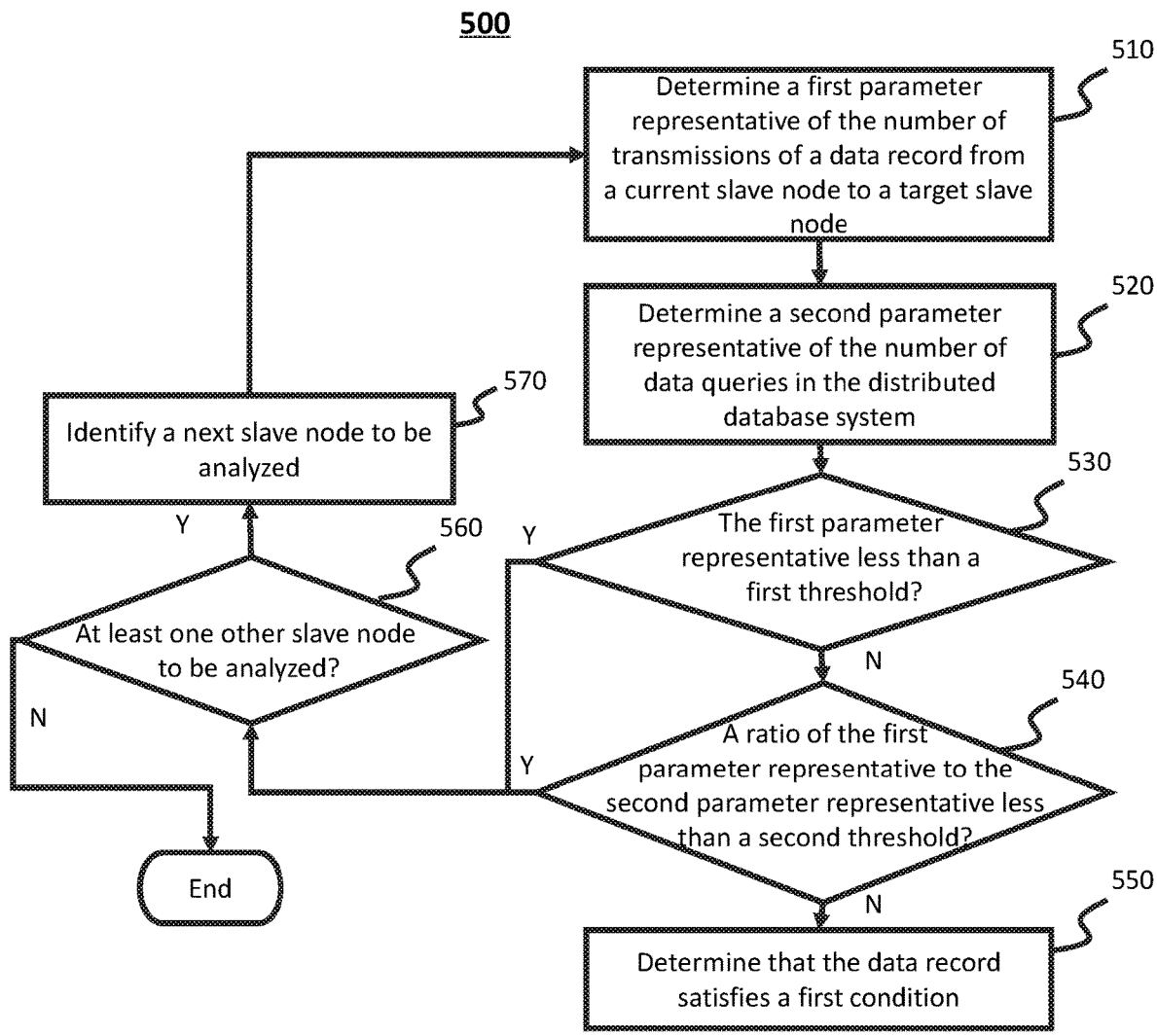
FIG. 5 is a flowchart of an exemplary process for implementing data migration policies for a data record according to some embodiments of the present disclosure.

FIG. 5 is a flowchart of an exemplary process 500 for implementing data migration policies for a data record according to some embodiments of the present disclosure. In some embodiments, one or more operations of process 500 can be performed to implement step 420 of the process 400 as illustrated in FIG. 4. In some embodiments, the process 500 may be implemented in the data storage system 100 as illustrated in FIG. 1. For example, the process 500 may be stored as a form of instructions, and invoked and/or executed by the master node 110. As another example, the process 500 may be stored in the storage (e.g., the ROM 230, the RAM 240, the disk 270, etc.) of the computing device 200 (e.g., the master node 110, the slave node 130 as illustrated in FIG. 1) as a form of instructions, and invoked and/or executed by the processor 220 of the computing device 200 (e.g., the master node 110, the slave node 130-1 as illustrated in FIG. 1).

In step 510, a processor (e.g., the processor 220 of FIG. 2) may determine a first parameter representative of the number of transmissions of a data record from a current slave node to a target slave node. The number of transmissions of a data record may be determined within a particular time period, from a particular current slave node, to a particular target slave node, etc. The particular time period may be, for example, a predetermined time period. More particularly, for example, the processor 220 may determine the number of transmissions of a particular data record from the current slave nodes to the target slave node within the predetermined time period.

In step 520, the processor may determine a second parameter representative of the number of data queries in a data storage system (e.g., the data storage system 100 of FIG. 1). The processor may determine the number of data queries in the data storage system 100 within a particular period of time. The processor may determine the number of a particular type of data queries in the data storage system 100. The processor 220 may also determine the number of data queries in a particular number of slave nodes in the data storage system 100.

In step 530, the processor may determine whether the first parameter representative is less than a first threshold. In some embodiments, the first threshold may be variable according to different application scenarios of the data storage system 100. More particularly, for example, the first threshold may be an integer within a predetermined range.

In some embodiments, the processor 220 may further determine whether the first parameter representative is a particular number of transmission of the data record from the current slave node to the target slave node. More particularly, for example, the processor 220 can determine the number of transmissions of each data record from the current node to the target node. The processor 220 may determine whether the first parameter representative is the greatest among the numbers of transmissions of the data records.

In some embodiments, in response to determining that the first parameter representative is not less than the first threshold, the process may proceed to step 540. Alternatively, the process may proceed to step 560 in response to determining that the first parameter representative is less than the first threshold.

In step 540, the processor may determine whether a ratio of the first parameter representative to the second parameter representative is less than a second threshold. In some embodiments, the second threshold may be variable according to different application scenarios of the data storage system 100. For example, the second threshold may be any fraction within a predetermined range from 0 to 1. More particularly, for example, the second threshold may be ½.

In response to determining that the ration of the first parameter representative to the second parameter representative is less than the second threshold, the process may proceed to step 550. Alternatively, the process may proceed to step 560 in response to determining that the ratio is less than the second threshold.

In step 550, the processor 220 may determine that the data record satisfies a first condition.

In some embodiments, in response to determining that the first parameter representative is less than the first threshold (e.g., "YES" in step 530), the processor 220 may determine whether at least one other slave node is to be analyzed in step 560. For example, the processor may determine whether all of the slave nodes in the data storage system have been analyzed. As another example, the processor 220 may determine whether a particular number of slave nodes in the data storage system have been analyzed.

In some embodiments, in response to determining that no slave node is to be analyzed, the processor may end the process 500. Alternatively, in response to determining that there is at least one other slave node to be analyzed, the processor may identify a next slave node to be analyzed in step 570. In some embodiments, the processor 220 may loop back to step 510 to analyze the next slave node. More particularly, for example, steps 510-570 may be performed to analyze the next slave node for data migration.

In some embodiments, in response to determining that the ratio of the first parameter representative to the second parameter representative is less than the second threshold (e.g., "YES" in step 540), the processor may determine whether at least one other slave node is to be analyzed in step 560. For example, the processor 220 may determine whether all of the slave nodes in the data storage system have been analyzed. As another example, the processor 220 may determine whether a particular number of slave nodes in the data storage system have been analyzed.

In some embodiments, in response to determining that no slave node is to be analyzed, the processor 220 may end the process 500. Alternatively, in response to determining that there is at least one other slave node to be analyzed, the processor 220 may identify a next slave node to be analyzed in step 570. In some embodiments, the processor 220 may loop back to step 510 to analyze the next slave node. More particularly, for example, step 510-580 may be performed to analyze the next slave node for data migration.

In some embodiments, the processor may implement one or more steps of the process 500 consecutively, or in parallel, or in any other orders, for implementing data migration policies for a data record. For example, the step 510 for determining a first parameter representative of number of transmissions of a data records from a current slave node to a target slave node may be implemented after the step 520 for determining a second parameter representative of the number of data queries in the data storage system 100. In some embodiments, the processor 220 may implement one or more steps of the process 500 for implementing data migration policies for a data record. For example, step 540 for determining whether the ration of the first parameter representative to the second parameter representative is less than the second threshold may be omitted. The processor 220 may determine that the data record satisfies the first condition after step 530 for determining that the first parameter representative is not less than the first threshold.

Figure 6:
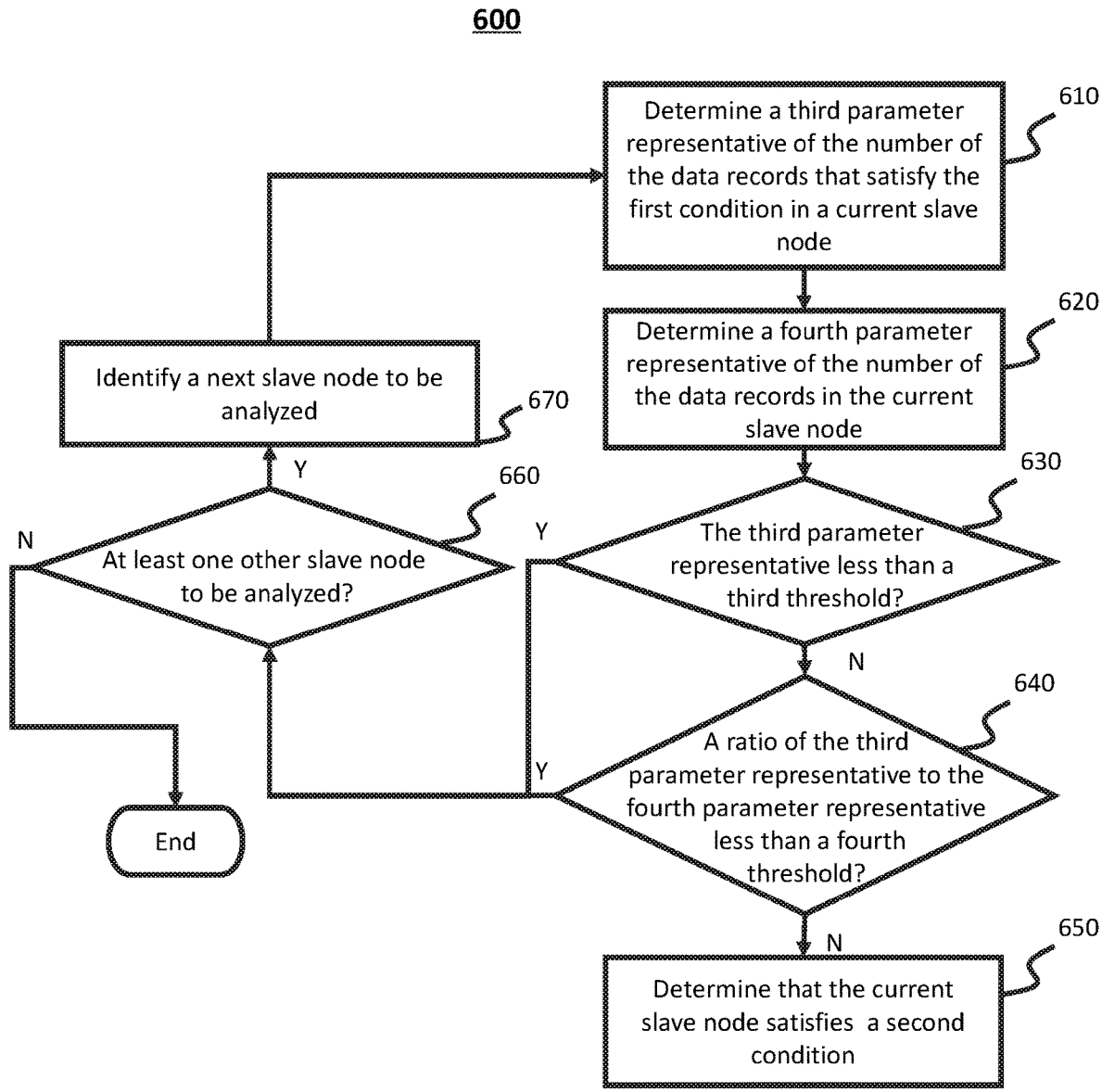
FIG. 6 is a flowchart of an exemplary process for implementing data migration policies for a slave node according to some embodiments of the present disclosure.

FIG. 6 is a flowchart of an exemplary process 600 for implementing data migration policies for a current slave node according to some embodiments of the present disclosure. In some embodiments, one or more operations of processor 600 may be performed to implement step 430 of the process 400 as illustrated in FIG. 4. In some embodiments, the process 600 may be implemented in the data storage system 100 as illustrated in FIG. 1. For example, the process 600 may be stored as a form of instructions, and invoked and/or executed by the master node 110. As another example, the process 600 may be stored in the storage (e.g., the ROM 230, the RAM 240, the disk 270, etc.) of the computing device 200 (e.g., the master node 110, the slave node 130 as illustrated in FIG. 1) as a form of instructions, and invoked and/or executed by the processor 220 of the computing device 200 (e.g., the master node 110, the slave node 130-1 as illustrated in FIG. 1).

In step 610, a processor (e.g., the processor 220 of FIG. 2) may determine a third parameter representative of the number of the data records that satisfy the first condition in a current slave node. In some embodiments, the processor may determine the number of the data records that satisfy the first condition in the current slave node within a particular time period. The particular time period may be, for example, a predetermined time period. The number of data records that satisfy the first condition may be predetermined and stored in the storage (e.g., the ROM 230, the RAM 240, the disk 270, etc.) of the computing device 200. The processor may then determine the number of data records that satisfy the first condition by invoking the number stored in the storage.

In step 620, the processor may determine a fourth parameter representative of the number of the data records in the current slave node. In some embodiments, the processor 220 may determine the number of the data records in the current slave node within a particular time period. The particular time period may be, for example, a predetermined time period. The number of data records in the current slave node may be predetermined and stored in the storage (e.g., the ROM 230, the RAM 240, the disk 270, etc.) of the computing device 200. The processor 220 may then determine the number of data records in the current slave node by invoking the number stored in the storage.

In step 630, the processor may determine whether the third parameter representative is less than a third threshold. In some embodiments, the third threshold may be variable according to different application scenarios of the data storage system 100. More particularly, for example, the first threshold may be an integer within a predetermined range.

In some embodiments, the processor may further determine whether the third parameter representative is a particular number of data records that satisfy the first condition in the current slave node. More particularly, for example, the processor 220 can determine the number of data records that satisfy the first condition in each slave nodes in the data storage system 100. The processor may determine whether the third parameter representative is the greatest among the numbers of data records of all the slave nodes in the data storage system 100.

In some embodiments, in response to determining that the third parameter representative is not less than the third threshold, the process may proceed to step 640. Alternatively, the process may proceed to step 660 in response to determining that the first parameter representative is less than the first threshold.

In step 640, the processor may determine whether a ratio of the third parameter representative to the fourth parameter representative is less than a fourth threshold. In some embodiments, the fourth threshold may be variable according to different application scenarios of the data storage system (e.g., the data storage system 100 of FIG. 1). For example, the fourth threshold may be any fraction within a predetermined range from 0 to 1. More particularly, for example, the fourth threshold may be a fraction that represents at least one of the total number of the data records in the current slave node.

In some embodiments, in response to determining that the ratio of the third parameter representative to the fourth parameter representative is not less than the fourth threshold, the process may proceed to step 650. Alternatively, the process may proceed to step 660 in response to determining that the ratio of the third parameter representative to the fourth parameter representative is less than the fourth threshold.

In step 650, the processor may determine that the current slave node satisfies a second condition.

In some embodiments, in response to determining that the third parameter representative is less than the third threshold (e.g., "YES" in step 630), the processor may determine whether at least one other slave node is to be analyzed in step 660. For example, the processor 220 may determine whether all of the slave nodes in the data storage system have been analyzed. As another example, the processor may determine whether a particular number of slave nodes in the data storage system have been analyzed.

In some embodiments, in response to determining that no slave node is to be analyzed, the processor may end the process 600. Alternatively, in response to determining that there is at least one other slave node to be analyzed, the processor may identify a next slave node to be analyzed in step 670. In some embodiments, the processor may loop back to step 610 to analyze the next slave node. More particularly, for example, steps 610-670 may be performed to analyze the next slave node for data migration.

In some embodiments, in response to determining that the ratio of the third parameter representative to the fourth parameter representative is less than the fourth threshold (e.g., "YES" in step 640), the processor may determine whether at least one other slave node is to be analyzed in step 660. For example, the processor may determine whether all of the slave nodes in the data storage system have been analyzed. As another example, the processor may determine whether a particular number of slave nodes in the data storage system have been analyzed.

In some embodiments, in response to determining that no slave node is to be analyzed, the processor may conclude the process 600. Alternatively, in response to determining that there is at least one other slave node to be analyzed, the processor may identify a next slave node to be analyzed in step 670. In some embodiments, the processor may loop back to step 610 to analyze the next slave node. More particularly, for example, steps 610-670 may be performed to analyze the next slave node for data migration.

In some embodiments, the processor may implement one or more steps of the process 600 consecutively, or in parallel, or in any other orders, for determining that a data record satisfies a first condition. For example, the step 610 for determining a third parameter representative of the number of the data records that satisfy the first condition in the current slave node may be implemented after the step 620 for determining a fourth parameter representative of the number of the data records in the current slave node.

TABLE 4

| Data record ID in slave node 1 | Number of transmissions to target slave node 2 | Number of transmissions to target slave node 3 | Number of transmissions to target slave node 10 |
|---|---|---|---|
| Data record 1 | 6 | 1 | 2 |
| Data record 2 | 5 | 0 | 1 |
| Data record 3 | 4 | 3 | 7 |
| Data record 4 | 0 | 1 | 3 |

For illustration purpose only, TABLE 4 depicts an exemplary statistical table when describing the exemplary method for data migration. In TABLE 4, the data storage system may include a master node and 10 slave nodes. A slave node 1 may include 4 data records. The fourth parameter representative may be 4 in the slave node 1. Merely by way of example, the data records in the slave node 1 may transmit from the slave node 1 to any other slave node, for example, a slave node 2, a slave node 3, and a slave node 10. In some embodiments, the processor 220 may determine the transmissions of each data record from the slave node 1 to the target slave node 2, the target slave node 3, the target slave node 4, . . . , and the target slave node 10.

For example, the processor 220 may determine 8 data queries in the data storage system. The second parameter representative may be 8.

The first condition in an application scenario of the data storage system may include the number of transmission from a current slave node to a target slave node of a data record is the greatest, and a ratio of a first parameter representative of the number of transmission from the current slave node to the target slave node to a second parameter representative of the number of data queries in the data storage system is not less than a second threshold of $\frac{1}{2}$.

The second condition in the application scenario of the data storage system may include a ratio of a third parameter representative of the number of data records that satisfy the first condition to a fourth parameter representative of the number of data records in the current slave node is not less than a fourth threshold of $1/4$.

As shown in TABLE 4, for the data record 1, the number of transmissions from the slave node 1 to the target slave node 2 is 6, which is the greatest compared with 1 of the target slave node 3, and 2 of the target slave node 10. The first parameter representative of data record 1 may be 6. The ratio of the first parameter representative to the second parameter representative may be $6/8$, which is larger than the second threshold of $1/2$. The data record 1 may satisfy the first condition.

For the data record 2, the number of transmissions from the slave node 1 to the target slave node 2 is 5, which is the greatest compared with 0 of the target slave node 3, and 1 of the target slave node 10. The first parameter representative of data record 2 may be 5. The ratio of the first parameter representative to the second parameter representative may be $5/8$, which is larger than the fourth threshold of $1/2$. The data record 2 may satisfy the first condition.

For the data record 3, the number of transmissions from the slave node 1 to the target slave node 10 is 7, which is the greatest compared with 4 of the target slave node 2, and 3 of the target slave node 3. The first parameter representative of data record 3 may be 7. The ratio of the first parameter representative to the second parameter representative may be $7/8$, which is larger than the fourth threshold of $1/2$. The data record 3 may satisfy the first condition.

For a data record 4, the number of transmission from the slave node 1 to the target slave node 10 is 3, which is the greatest compared with 0 of the target slave node 2, and 1 of the target slave node 3. The first parameter representative of data record 4 may be 3. The ratio of the first parameter representative to the second parameter representative may be $3/8$, which is less than the fourth threshold of $1/2$. The data record 4 may not satisfy the first condition.

The data record 1, the data record 2, and the data record 3 in the slave node 1 may satisfy the first condition. The third parameter representative is 3. The ratio of the third parameter representative to the fourth parameter representative may be $3/4$, which is larger than the fourth threshold of $1/4$. The slave node 1 may satisfy the second condition.

In some embodiments, the processor 220 may analyze one or more other slave nodes in the data storage system 100 as the method of analyzing the slave node 1 in TABLE 4 described above. For example, the first threshold may be 5. If the first parameter representative of the number of the slave nodes that satisfy the second condition is 7, which is larger than the first threshold of 5. The processor 220 may migrate the one or more data records that satisfy the first condition in the one or more slave nodes that satisfy the second condition to one or more corresponding target slave nodes. For example, as illustrated in TABLE 4, the processor 220 may respectively migrate the data record 1, the data record 2 and/or the data record 3 to the corresponding target slave node 2, the corresponding target slave node 2, and/or the corresponding target slave node 10.

In some embodiments, the may initialize the statistical tables in the data storage system after a data migration.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc. In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A system, comprising:
    at least one computer-readable storage medium including a set of instructions for migrating data records; and
    at least one processor in communication with the computer-readable storage medium, wherein when executing the set of instructions, the at least one processor is directed to:
        query data in a data storage system comprising a plurality of slave nodes;
        determine, from a plurality of data records in the plurality of slave nodes, at least one candidate data record that satisfies a first condition;
        identify, from the plurality of slave nodes, at least one candidate slave node that satisfies a second condition by
            determining a third parameter representative of the number of data records that satisfy the first condition in a candidate slave node of the at least one candidate slave node;
            determining that the third parameter is not less than a third threshold;
            determining a fourth parameter representative of the number of the data records in the candidate slave node; and
            determining that a ratio of the third parameter to the fourth parameter is not less than a fourth threshold; and
        in response to determining that the number of the at least one candidate slave node is not less than a threshold value, migrate the at least one candidate data record to at least one target slave node.

2. The system of claim 1, wherein the data storage system is a distributed data storage system.

3. The system of claim 1, wherein to identify the at least one candidate slave node that satisfies the second condition, the at least one processor is further directed to:
    determine whether a current slave node of the plurality of slave nodes satisfies the second condition in response to determining that a first data record in the current slave node satisfies the first condition.

4. The system of claim 1, wherein to determine the at least one candidate data record that satisfies the first condition, the at least one processor is further directed to:
    determine a first parameter representative of the number of transmissions of the candidate data record from the at least one candidate slave node to the target slave node; and determine that the first parameter representative is not less than a first threshold.

5. The system of claim 4, wherein to determine the at least one candidate data record that satisfies the first condition, the at least one processor is further directed to:
 determine a second parameter representative of the number of data queries in the data storage system; and
 determine that a ratio of the first parameter to the second parameter is not less than a second threshold.

6. The system of claim 1, wherein the threshold value corresponds to the number of the plurality of slave nodes.

7. A method, comprising:
 querying data in a data storage system comprising a plurality of slave nodes;
 determining, from a plurality of data records in the plurality of slave nodes, at least one candidate data record that satisfies a first condition;
 identifying, from the plurality of slave nodes, at least one candidate slave node that satisfies a second condition by
  determining a third parameter representative of the number of data records that satisfy the first condition in a candidate slave node of the at least one candidate slave node;
  determining that the third parameter is not less than a third threshold;
  determining a fourth parameter representative of the number of the data records in the candidate slave node; and
  determining that a ratio of the third parameter to the fourth parameter is not less than a fourth threshold; and
 in response to determining that the number of the at least one candidate slave node is not less than a threshold value, migrating, by at least one processor, the at least one candidate data record to at least one target slave node.

8. The method of claim 7, wherein the data storage system is a distributed data storage system.

9. The method of claim 7, wherein identifying the at least one candidate slave node that satisfies the second condition comprises:
 determining whether a current slave node of the plurality of slave nodes satisfies the second condition in response to determining that a first data record in the current slave node satisfies the first condition.

10. The method of claim 7, wherein determining the at least one candidate data record that satisfies the first condition comprises:
 determining a first parameter representative of the number of transmissions of the candidate data record from the at least one candidate slave node to the target slave node; and
 determining that the first parameter representative is not less than a first threshold.

11. The method of claim 10, wherein determining the at least one candidate data record that satisfies the first condition comprises:
 determining a second parameter representative of the number of data queries in the data storage system; and
 determining that a ratio of the first parameter to the second parameter is not less than a second threshold.

12. The method of claim 7, wherein the threshold value corresponds to the number of the plurality of slave nodes.

13. A non-transitory computer-readable medium, comprising at least one set of instructions for migrating data records, wherein when executed by at least one processor, the at least one set of instructions directs the at least one processor to:
 query data in a data storage system comprising a plurality of slave nodes;
 determine, from a plurality of data records in the plurality of slave nodes, at least one candidate data record that satisfies a first condition;
 identify, from the plurality of slave nodes, at least one candidate slave node that satisfies a second condition by
  determining a third parameter representative of the number of data records that satisfy the first condition in a candidate slave node of the at least one candidate slave node;
  determining that the third parameter is not less than a third threshold;
  determining a fourth parameter representative of the number of the data records in the candidate slave node; and
  determining that a ratio of the third parameter to the fourth parameter is not less than a fourth threshold; and
 in response to determining that the number of the at least one candidate slave node is not less than a threshold value, migrate the at least one candidate data record to at least one target slave node.

14. The non-transitory computer-readable medium of claim 13, wherein to identify the at least one candidate slave node that satisfies the second condition, the at least one processor is further directed to:
 determine whether a current slave node of the plurality of slave nodes satisfies the second condition in response to determining that a first data record in the current slave node satisfies the first condition.

15. The non-transitory computer-readable medium of claim 13, wherein to determine the at least one candidate data record that satisfies the first condition, the at least one processor is further directed to:
 determine a first parameter representative of the number of transmissions of the candidate data record from the at least one candidate slave node to the target slave node; and
 determine that the first parameter representative is not less than a first threshold.

16. The non-transitory computer-readable medium of claim 15, wherein to determine the at least one candidate data record that satisfies the first condition, the at least one processor is further directed to:
 determine a second parameter representative of the number of data queries in the data storage system; and
 determine that a ratio of the first parameter to the second parameter is not less than a second threshold.

* * * * *